US007808666B2

(12) United States Patent
Kato

(10) Patent No.: US 7,808,666 B2
(45) Date of Patent: Oct. 5, 2010

(54) DATA PROCESSING DEVICE, PRINT SETTING PROCESSING METHOD, STORAGE DEVICE FOR STORING COMPUTER-READABLE PROGRAM AND PROGRAM

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 11/274,596

(22) Filed: Nov. 15, 2005

(65) Prior Publication Data
US 2006/0103869 A1 May 18, 2006

(30) Foreign Application Priority Data
Nov. 15, 2004 (JP) ............... 2004-330476

(51) Int. Cl.
G06F 3/12 (2006.01)
G06F 3/00 (2006.01)
G06K 15/00 (2006.01)
(52) U.S. Cl. .............. 358/1.15; 358/1.14; 719/321; 719/329
(58) Field of Classification Search .......... None
See application file for complete search history.

(56) References Cited

U.S. PATENT DOCUMENTS

| 6,661,530 | B1* | 12/2003 | Munetomo et al. | 358/1.15 |
| 7,467,392 | B1* | 12/2008 | Ludwig et al. | 719/328 |
| 2002/0065807 | A1* | 5/2002 | Kawamoto et al. | 707/1 |
| 2002/0161936 | A1* | 10/2002 | Minagawa | 710/1 |
| 2003/0076512 | A1* | 4/2003 | Laughlin | 358/1.2 |
| 2004/0212829 | A1* | 10/2004 | Uchida | 358/1.15 |
| 2005/0117180 | A1* | 6/2005 | Kato | 358/1.15 |

* cited by examiner

*Primary Examiner*—Mark K Zimmerman
*Assistant Examiner*—Mesfin Getaneh
(74) *Attorney, Agent, or Firm*—Cowan, Liebowitz & Latman, P.C.

(57) ABSTRACT

A method in a data processing device for processing a print request from an application using a print driver or a plug-in module for extending the printer driver is disclosed. The method includes a discrimination step of discriminating a conflict between a setting inputted to the plug-in module and a setting inputted to at least one of the plug-in module or the printer driver and a notification step of notifying the application of response information relating to the reason for the conflict.

11 Claims, 9 Drawing Sheets

APPLICATION

PRINTER DRIVER

FIG. 7

SETTING MODIFICATION PROCESS INITIALIZATION FUNCTION

```
HANDLE DocumentPropertiesInit (
    PDEVMODE pDevMode, //PRINT SETTING INFORMATION
);
```
{ F1 }

SETTING MODIFICATION PROCESS FUNCTION

```
DWORD WINAPI DocumentPropertiesEX (
    HANDLE hCDM, //HANDLE
    unsigned int ItemID, //SETTING ITEM
    PDEVMODE pDevMode, //PRINT SETTING INFORMATION
    PVOID pItem //DATA FOR PASSING INFORMATION
);
```
{ F2 }

SETTING MODIFICATION PROCESS EXIT FUNCTION

```
int DocumentPropertiesTerm (
    HANDLE hCDM, //HANDLE
);
```
{ F3 }

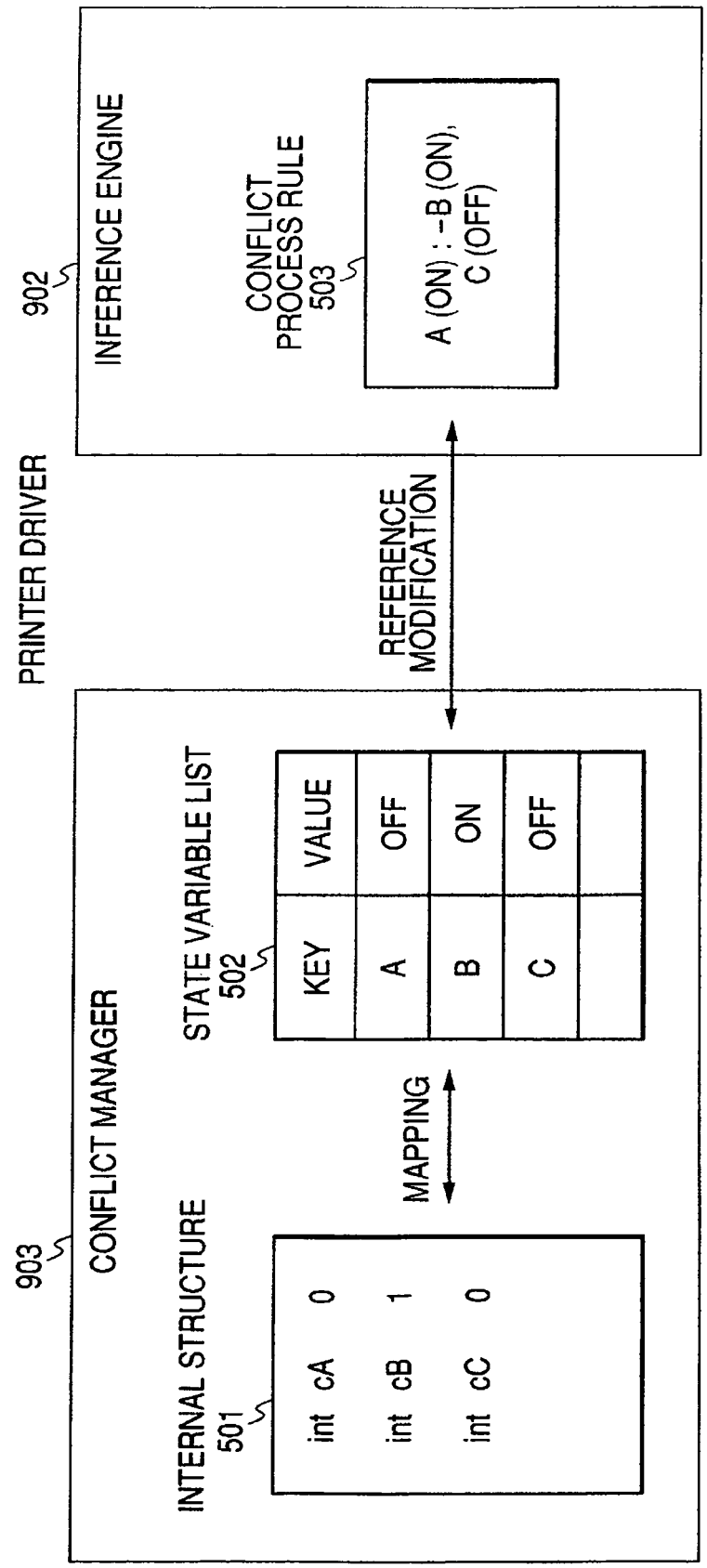

EXAMPLE OF CONFLICT INFORMATION (1)

EXAMPLE OF CONFLICT INFORMATION (2)

MEMORY MAP OF STORAGE MEDIUM

DATA PROCESSING DEVICE, PRINT SETTING PROCESSING METHOD, STORAGE DEVICE FOR STORING COMPUTER-READABLE PROGRAM AND PROGRAM

BACKGROUND OF THE INVENTION

1. Field of the Invention

The present invention relates to a data processing device for transferring a print data from an application to a printer via a printer driver, a print setting processing method, a storage device for storing a computer-readable program and the program.

2. Related Background Art

Conventionally, when an application running on a computer performs a printing, a typical method is that the application passes as parameters various types of settings required for the printing to a print-related processing program such as a printer driver.

In this manner, by passing as the parameters the various types of settings required for the printing from the program to the printer driver, the printout intended by the program can be obtained (e.g. refer to Japanese Patent Application Laid-Open No. 2002-328757).

This patent document describes discriminating whether the settings conflict at function setting, controlling graying of a setting item such that the setting item cannot be selected and displaying a message indicating that the setting item cannot be selected. However, setting types that can be specified to obtain the intended printout is within very limited range such as so-called specification of paper supply port and specification of duplex/simplex print which are considered to be supported by any printer, and for other useful functions which cannot be directly specified by an application program, it was required to open a user interface of the printer driver to specify the function.

Therefore, for printout from various types of system software in a company, a problem occurs that a printer or a printer driver function is fully used if it is not desired to display a user interface of the printer driver.

Therefore, a printer driver is recently emerging that allows a printer or printer driver type dependent setting to be equally set as a printer driver user interface by providing and using a special interface available from an application so as to make full use of the printer or the printer driver.

Such special interface may be used in a printer driver having an extended function in a plug-in form.

The functional extension of the printer driver in the plug-in form is a method of providing an additional function by providing a differential module or a plug-in aside from a printer driver install set distributed from a printer vendor.

In this situation, in changing a function setting extended by the plug-in using the special interface from the application, the printer driver may return a notification indicating that a modification of the setting cannot be performed if a conflict with other print setting occurs.

For example, assume that the conflict setting combination is a booklet print function and a duplex print function which are the extension functions.

Then, if the duplex print function is enabled, performing a setting modification process for enabling the booklet print function using the interface from the application causes the printer driver to return to the application the notification indicating that the setting modification cannot be performed.

In this situation, because the application side cannot recognize which print settings conflict, the desired print settings cannot be performed.

SUMMARY OF THE INVENTION

The present invention is intended to eliminate at least one of the above problems.

A first aspect of the present invention is to provide a mechanism that allows to easily construct a convenient print setting processing environment that can be changed to a print setting in which an extended function does not conflicts with an application side setting.

A second aspect of the present invention is to avoid a situation in which other print setting prevents a setting modification process and to provide a desired print setting from an application.

One aspect of the prevent invention is a method in a data processing device for processing a print request from an application using a print driver or a plug-in module for extending the printer driver, the method having a discrimination step of discriminating a conflict between a setting inputted to the plug-in module and a setting inputted to at least one of the plug-in module or the printer driver and a notification step of notifying the application of response information relating to the reason for the conflict.

Other features and advantages of the present invention will be apparent from the following description taken in conjunction with the accompanying drawings, in which like reference characters designate the same or similar parts throughout there of.

BRIEF DESCRIPTION OF THE DRAWINGS

FIG. 7 describes function information required for the setting modification process exposed by the driver managing part shown in FIG. 4;

FIG. 8 shows a relationship between the conflict manager and the inference engine shown in FIG. 4;

DESCRIPTION OF THE PREFERRED EMBODIMENTS

The best mode for carrying out the present invention is now described with reference to the drawings.

<System Configuration Description>

The preferred embodiments of the present invention are described below.

First Embodiment

Figure 1:
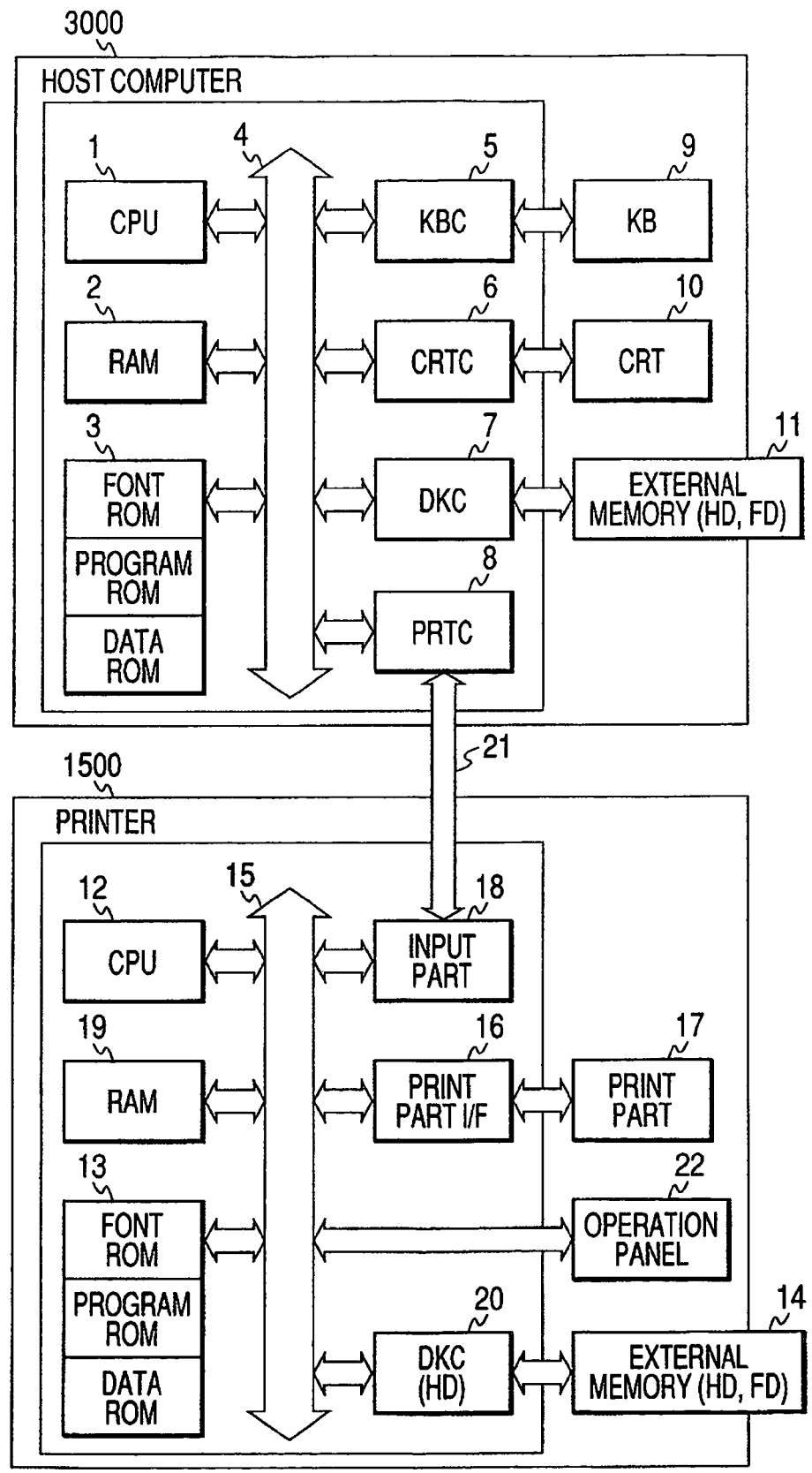
FIG. 1 is a block diagram describing a configuration of a print processing system to which a data processing device showing a first embodiment of the present invention is applicable.

FIG. 1 is a block diagram describing a configuration of a print processing system to which a data processing device showing a first embodiment of the present invention is applicable. Unless otherwise specified, it is obvious that the present invention is applicable to a single apparatus, a system consisting of a plurality of apparatus and a system in which connection and processing are made via a network such as LAN or WAN.

In FIG. 1, reference numeral 3000 denotes a host computer and the host computer comprises a CPU 1 for executing a processing of document including figures, images, tables (including spreadsheets) and the like based on a document processing program or the like stored in a program ROM in a ROM 3 or a external memory 11, and the CPU 1 collectively controls each device connected to a system bus 4.

An operating system program (hereinafter OS) or the like that is a control program for the CPU 1 is stored in the program ROM in the ROM 3 or the external memory 11, a font data or the like used in the above document processing is stored in a font ROM in the ROM 3 or the external memory 11, and various types of data used in the above document processing are stored in a data ROM in the ROM 3 or the external memory 11.

Reference numeral 2 denotes a RAM and the RAM functions as a main memory, a work area or the like. Reference numeral 5 denotes a keyboard controller (KBC) and the KBC controls a key input from a keyboard (KB) 9 or a pointing device (not shown). Reference numeral 6 denotes a CRT controller (CRTC) and the CRTC controls a display of a CRT display (CRT) 10. Reference numeral 7 denotes a disk controller and the disk controller controls an access to the external memory 11 such as a hard disk (HD) and a flexible disk (FD) for storing a boot program, various types of applications, a font data, a user file, a edit file, a program for generating a printer control command (hereinafter printer driver) and the like.

Reference numeral 8 denotes a printer controller (PRTC) and the printer controller is connected to a printer 1500 via a predetermined two-way interface 21 and performs a communication control process with the printer 1500. The CPU 1 executes data development (rasterization) of outline fonts into for example a display information RAM set on the RAM 2 to enable WYSIWYG on the CRT 10.

Also, CPU 1 opens various windows registered based on commands indicated by a mouse cursor (not shown) on the CRT 10, and executes various data processings. In performing printing, a user can open a window for print settings to set a method of a print process for the printer driver including printer settings and a selection of a print mode.

In printer 1500, reference numeral 12 denotes a printer CPU and the printer CPU outputs a image signal as output information to a print part (printer engine) 17 connected to a system bus 15 based on a control program or the like stored in stored in a program ROM in a ROM 13 or a control program or the like stored in an external memory 14.

A control program of the CPU 12 or the like is stored in the program ROM in the ROM 13. A font data or the like used in generating the output information is stored in a font ROM in the ROM 13, and if the printer does not have the external memory 14 such as a hard disk, information used on a host computer or the like is stored in a data ROM in the ROM 13.

The CPU 12 can communicate with the host computer 3000 via an input part 18, and is configured to be capable of notifying the host computer 3000 of information within the printer 1500 or the like. Reference numeral 19 denotes a RAM that functions as a main memory, work area or the like of the CPU 12, and is configured to be capable of extending memory capacity by a optional RAM connected to a add-on port (not shown).

The RAM 19 is used for an output information extraction region, an environmental data storage, an NVRAM or the like. A disk controller (DKC) 20 controls access to the above-described external memory 14 such as a hard disk (HD) or an IC card. The external memory 14 is optionally connected and stores a font data, an emulation program, a form data and the like. Reference numeral 18 denotes the above-described operation panel and the operation panel comprises a switch for operation, an LED indicator and the like.

The number of the above-described external memory is not limited to one but is at least one, and the printer 1500 may also be configured such that the a plurality of external memories can be connected storing a option font card and a program for interpreting different printer control languages as well as a built-in font. Further, the printer 1500 can also have an NVRAM (not shown) to store a printer mode setting information from the operation panel 22.

Figure 2:
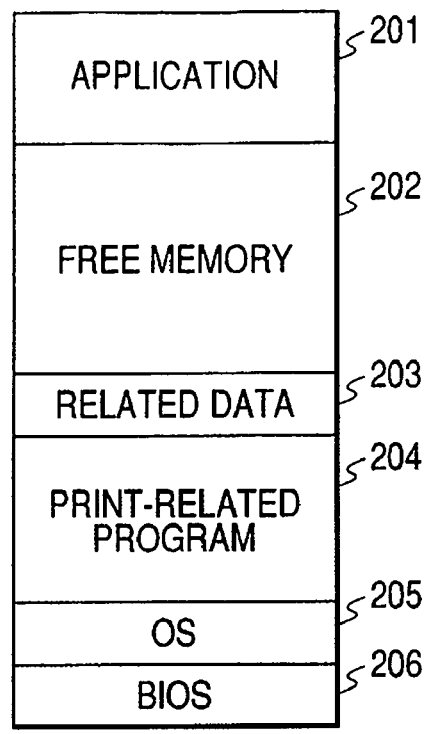
FIG. 2 shows an example of a memory map of the RAM shown in FIG. 1.

FIG. 2 shows an example of a memory map of the RAM 2 shown in FIG. 1 and shows a memory map of the RAM 2 with a predetermined application and a print-related program invoked to be loaded into the RAM 2 on the host computer 3000.

As shown in FIG. 2, a BIOS 206, an OS 205, an application 201, a print-related program 204 and a related data 203 are loaded into the RAM 2, and a free memory region (free memory) 202 is also reserved. This makes the application 201 and the print-related program 204 executable.

Figure 3:
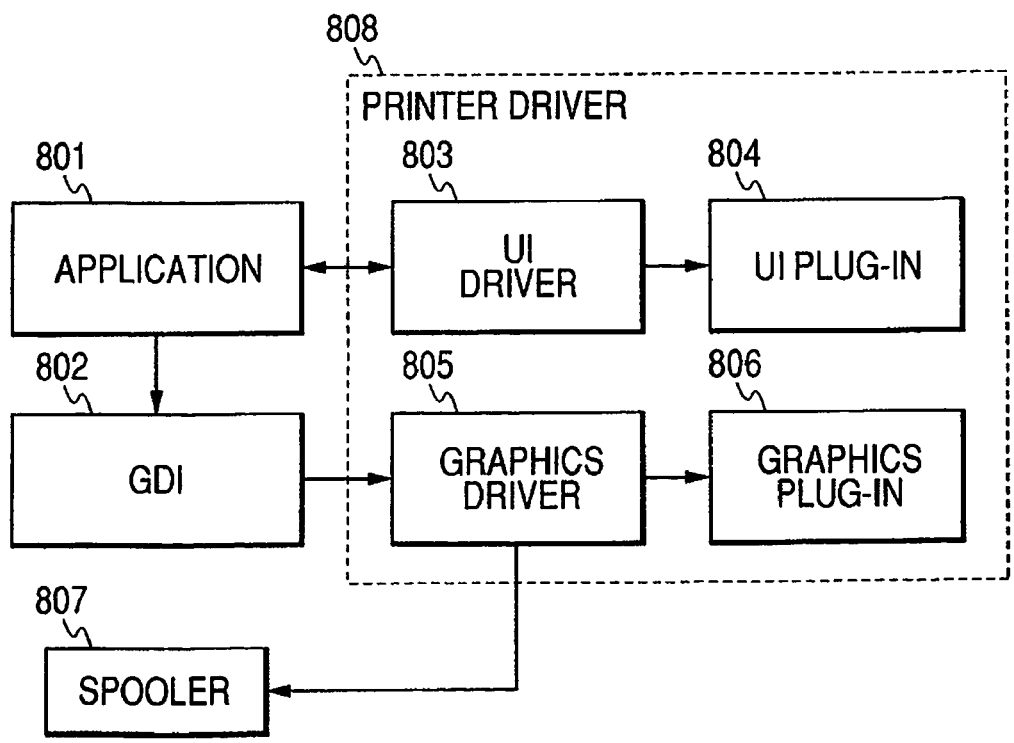
FIG. 3 is a schematic block diagram showing an exemplary print processing of various types of modules in the host computer shown in FIG. 1.

This embodiment is configured such that a plug-in module is added to a printer driver in a printer driver extension system in FIG. 8 described below. As shown in FIG. 3 described below, the plug-in module consists of an UI plug-in 804 having an extended function of an UI driver 803 and a graphic plug-in 806 having an extended function of a graphics driver 805. Each plug-in module will be described with reference to FIG. 3.

FIG. 3 is a schematic block diagram showing an exemplary print processing of various types of modules in the host computer 3000 shown in FIG. 1.

In FIG. 3, reference numeral 801 denotes an application. Reference numeral 804 denotes a plug-in and is used to add a new sheet to the UI driver 803 or to customize various event processes implemented and executed by the UI driver 803, such as a process at installation.

Reference numeral 803 denotes a UI driver and the UI driver acquires an interface exposed by the UI plug-in 804 when a DDI (Device Driver Interface) exported to the system is called. The customization process implemented in the UI driver 803 is executed by communicating with the UI plug-in 804 using the interface of the UI plug-in 804 acquired by the UI driver 803.

On the other hand, the graphics plug-in 806 is used to intercept a process of the DDI which is an interface between a GDI (Graphics Device Interface) 802 and a graphics driver 805 or to add the process at particular timing, or to intercept a spool process of a print data.

The DDI exported by the graphics driver 805 is appropriately called from the GDI 802 to generate a job, and at this initialization timing, the graphics driver 805 acquires the interface exposed by the graphics plug-in 806 and stores in the RAM 2.

Then, using the interface acquired by the graphics driver 805, a process of the graphics plug-in 806 corresponding to that DDI is invoked at the time when the DDI is called, and the invoked graphics plug-in 806 executes the process implemented in the plug-in and returns again the process to the graphics driver 805.

If the graphics plug-in 806 is now intercepting the process, the DDI finishes the process, or if the graphics plug-in 806 implements an additional process, subsequent processes continue.

Otherwise, if the graphics plug-in 806 intercepts the spool process of the print data in the graphics driver 805, the interface of the graphics plug-in 806 is called just before the print data in the graphics driver 805 is spooled. Then, after the called graphics plug-in 806 acquires the spooled data and a particular process is performed, the data subjected to the particular process is passed to the graphics driver 805 by calling again a spool process function of the graphics driver 805.

Then, the graphics driver 805 that received the data executes a process for actually spooling the data into a system spooler (spooler) 807.

By implementing the extended function in the plug-in module in this manner, the extended system of the printer driver is achieved.

Figure 4:
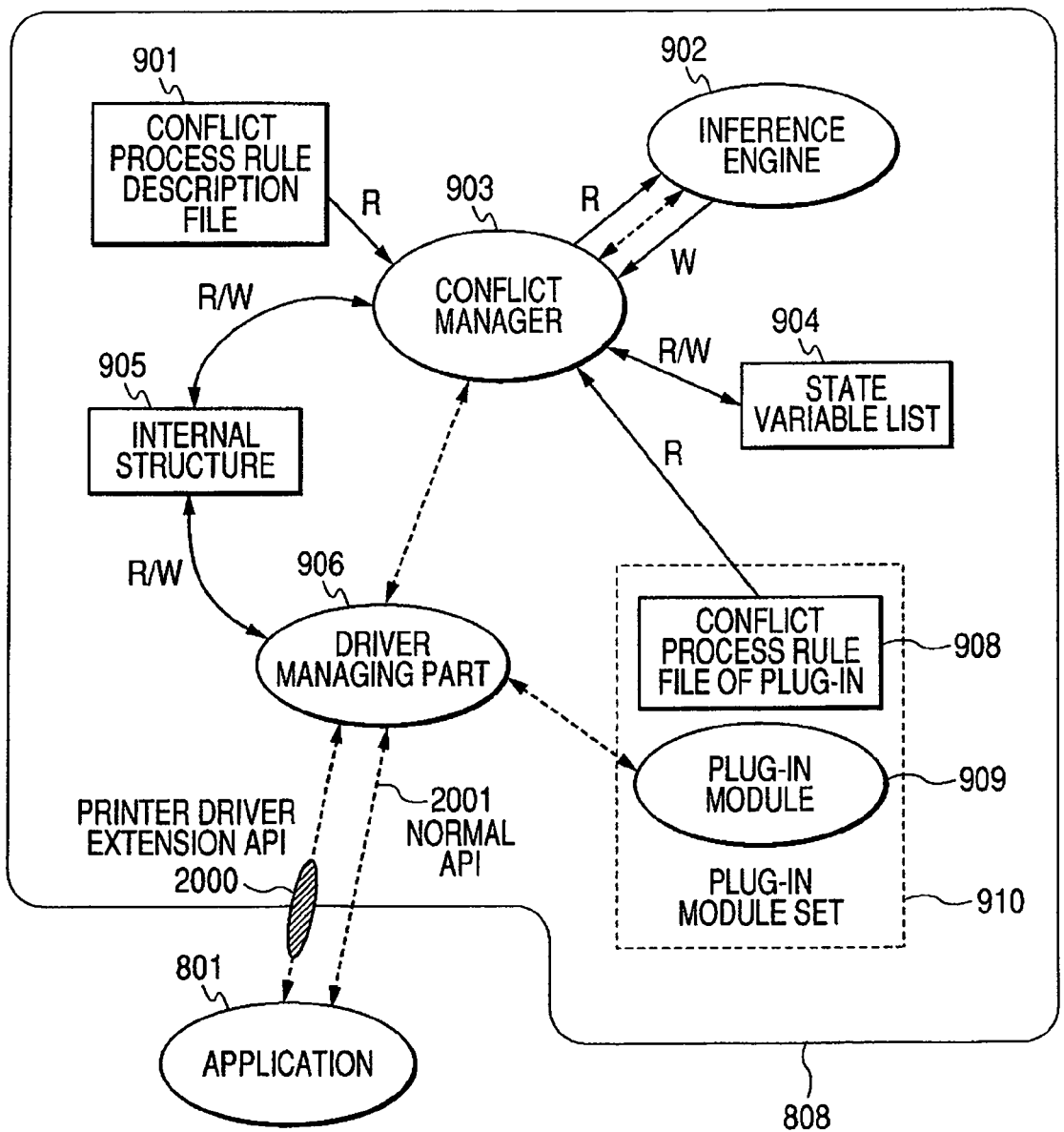
FIG. 4 schematically describes schematic configuration of the application shown in FIG. 3 and the print-related program shown in FIG. 2.

FIG. 4 schematically describes schematic configuration of the application 801 shown in FIG. 3 and the print-related program 204 shown in FIG. 2.

In FIG. 4, reference numeral 906 denotes a driver control part and the driver control part controls a series of processes upon printing from the application 801. Reference numeral 903 denotes a conflict manager and the conflict manager manages data passing between each module, data update and the like and oversees the conflict process.

Reference numeral 901 denotes a conflict process rule description file and enumerates conflict process rules showing inconsistency avoidance strategy described as a description form described below.

Reference numeral 910 denotes a plug-in module set providing a printer driver extension system and the plug-in module set consists of a plug-in module 909 and a plug-in conflict process rule file 908 which depends on the plug-in module 909.

This plug-in conflict process rule 908 is described in the similar format as the conflict process rule description file 901.

Reference numeral 902 denotes an inference engine and the inference engine loads a conflict process rule description file 901 and a plug-in conflict process rule file 908 to apply the conflict process rule to inputted settings to estimate the state of each function.

Reference numeral 904 denotes a state variable list showing the state of each printer function in a list form and may be updated based on user input and the content of the conflict process rule description file 901 and the conflict process rule file 908.

Reference numeral 905 denotes an internal structure as a document (business form) reflecting the setting for the driver managing part 906 to execute a printing, and holds the state of each printer function in connection with the state variable list 904.

Reference numeral 906 denotes a driver managing part and the driver managing part exposes functions associated with a print setting modification process to the application 801, and the application 801 loads these functions and performs the print setting modification process. As shown, the functions associated with the print setting modification process includes a printer driver extension API 2000 and a normal API 2001. In principle, the application 801 exchanges plug-in driver information and controls the plug-in module using the printer driver extension API 2000.

In the data processing device configured in this manner, assume that the plug-in module is a booklet add-in, and if the ON state of the booklet add-in and 2UP print from the application 801 cannot be simultaneously set (assume that 2UP is higher priority), in the state of 2UP print being set, setting the plug-in module set 909 for booklet add-in to ON by the driver managing part 906 causes "NOT_AVAILABLE" to be returned, meaning that it cannot be set in the current state.

The application 801 queries the conflict information via the driver managing part 906. The driver managing part 906 queries the booklet add-in for the conflict information. The conflict manager 903 acquires the conflict process rule file 908 acquired from the plug-in module set 909 to generate predetermined response information indicating a setting (page layout) showing a function having a conflict with the setting of the booklet function and an avoidable setting, for example (CDM_ITEM_LAYOUT—current setting: "2UP", avoidable setting: "1UP") to communicate from the driver managing part 906 to the application 801.

After changing the setting having the conflict and enabling the (2UP-to-1UP) add-in function based on the acquired conflict information, the application 801 executes a setting process to enable booklet add-in function again. This avoids the situation that the add-in function cannot used by acquiring the conflict information of the add-in function by the application 801 via the printer driver extension API 2000.

Figure 5A:
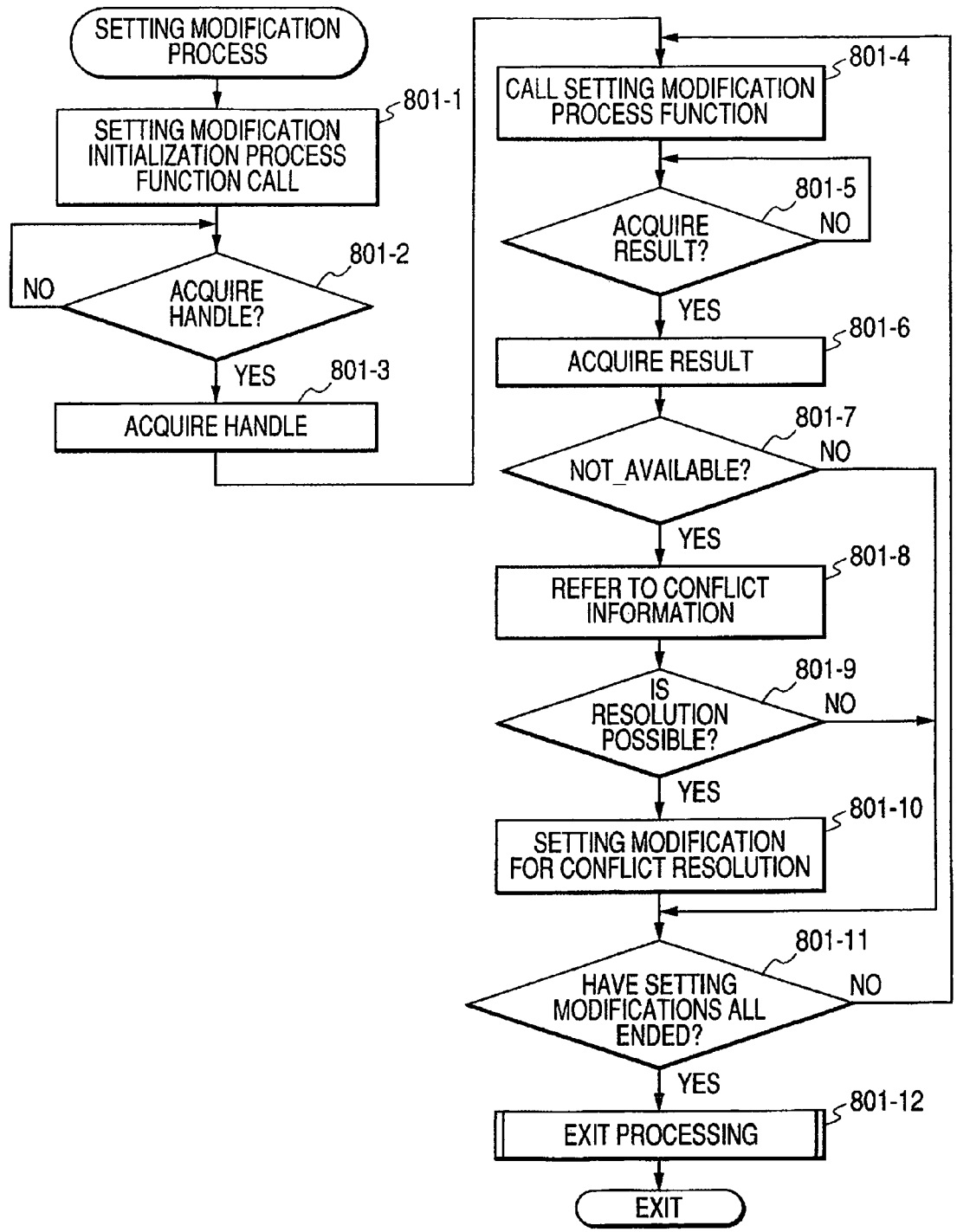
FIGS. 5A and 5B are flowcharts showing examples of the data process procedures in the data processing device according to the present invention.
Figure 5B:
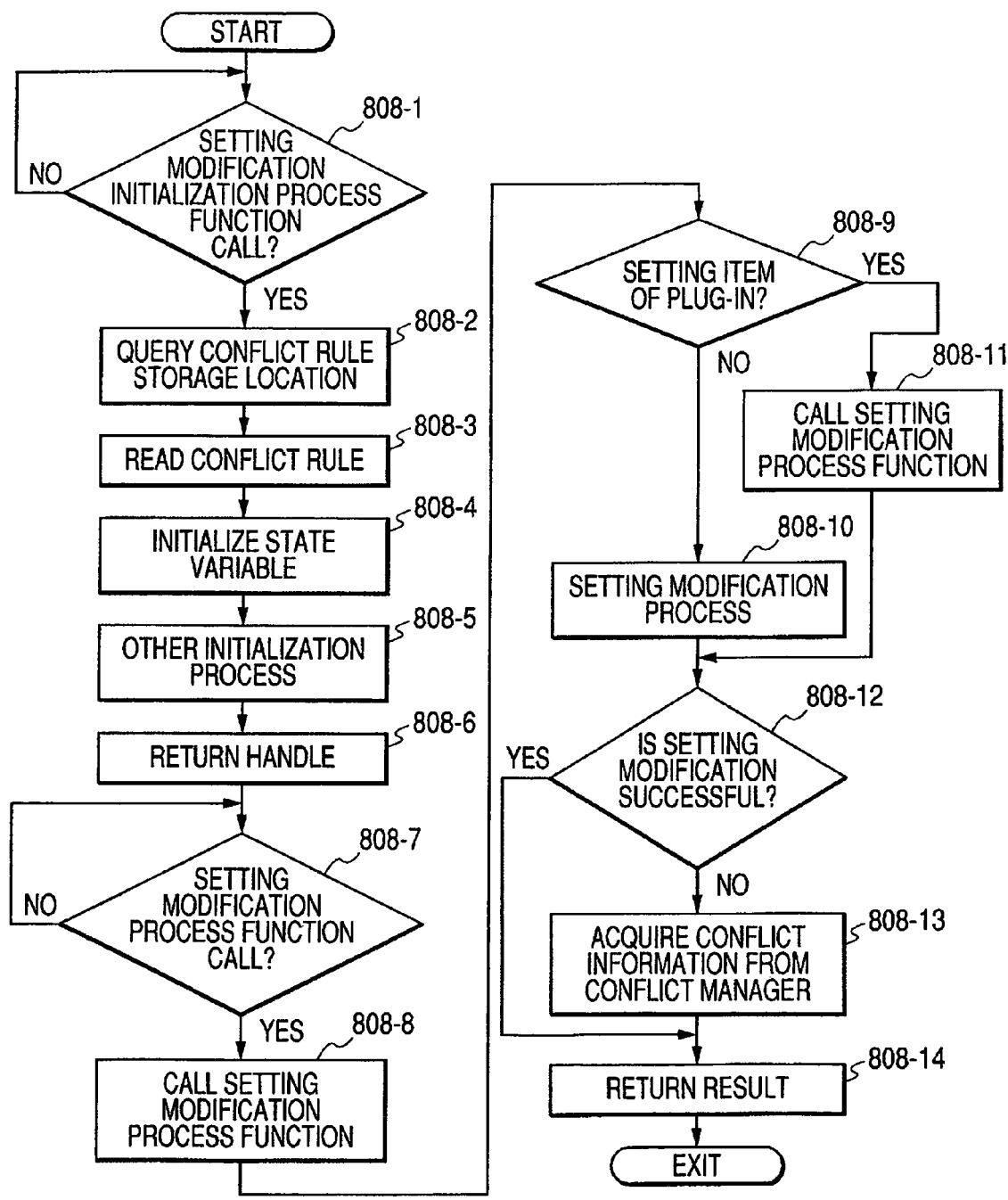
Figure 6:
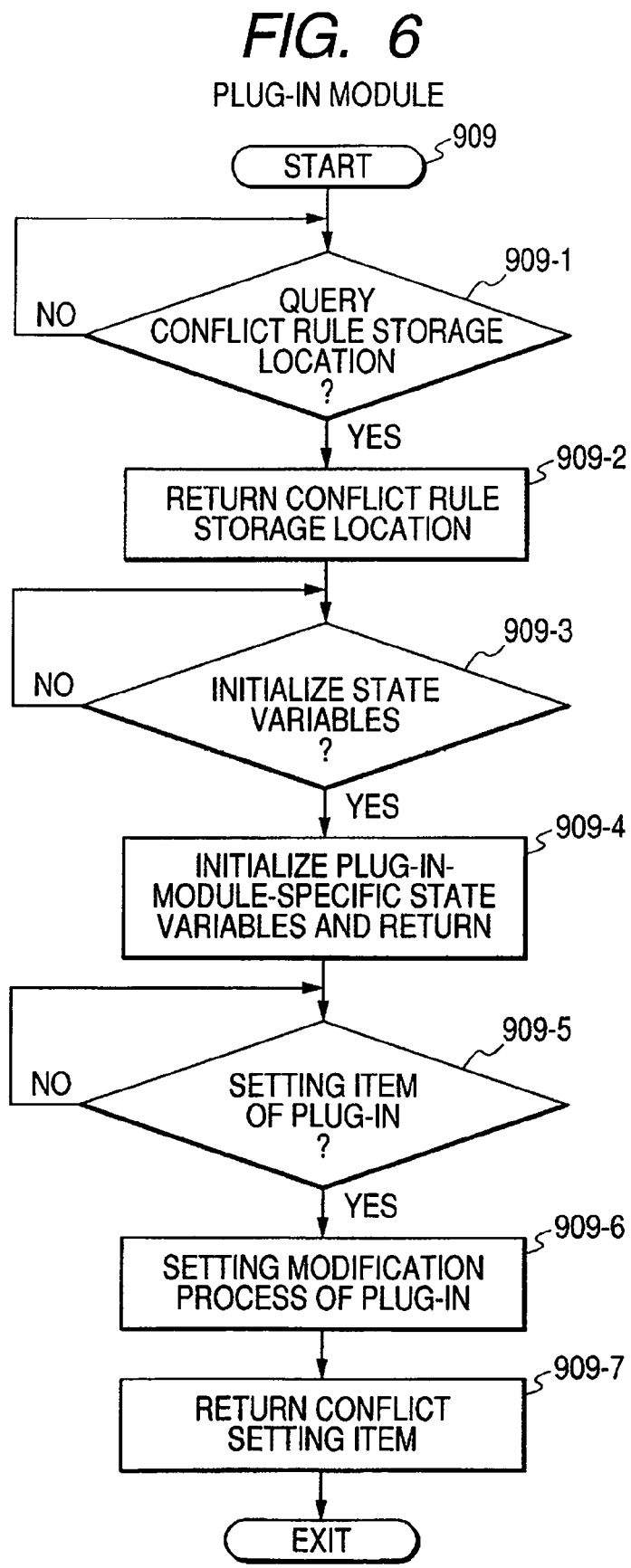
FIG. 6 is a flow chart showing an example of the data process procedures in the data processing device according to the present invention.

FIGS. 5A, 5B and 6 are flow charts showing examples of the data process procedures in the data processing device according to the present invention and correspond to a procedure for improving a conflict between an extended function and a current print setting with regard to a setting modification indication from the application 801 shown in FIG. 4, notifying the application 801 of that content as predetermined response information, and automatically modifying the print setting based on the notification. (801-1) to (801-12) in FIG. 5A correspond to steps executed by the application 801, (808-1) to (808-12) in FIG. 5B correspond to steps executed by the driver managing part 906 shown in FIG. 4, and (909-1) to (909-7) in FIG. 6 correspond to steps executed by the plug-in module 909.

FIG. 7 describes function information required for the setting modification process exposed by the driver managing part 906 shown in FIG. 4, and for example, the function information is stored in the external memory 11 or the ROM 3 shown in FIG. 1.

In FIG. 7, reference numeral F1 denotes a setting modification process initialization function, F2 denotes a setting modification process function, and F3 denotes a setting modification process exit function.

First, the application 801 calls the setting modification initialization function F1 exposed by the driver managing part 906 as shown in FIG. 7 (801-1). At this point, the print setting information is passed from the application 801 to arguments of the setting modification process initialization function F1. Upon accepting that the setting modification initialization function F1 is called (808-1), the driver managing part 906 queries the plug-in module 909 for the storage location of the plug-in conflict process rule file 908 (808-2). Upon receiving this query (909-1), the plug-in module 909 returns the storage location of the plug-in conflict process rule file 908 to the driver managing part 906 (909-2).

Next, the driver managing part 906 passes the print setting information received from the application 801 via the printer driver extension API 2000 to the conflict manager 903, and the conflict manager 903 loads the plug-in conflict process rule 908 based on the conflict process rule description file 901 and the storage location returned at step (909-2). Based on the received print setting information, the conflict manager 903 initializes the state variable for generating the state variable list 904 (808-4).

At this point, when a call for the plug-in module initialization process is accepted (909-3), plug-in-module-specific state variables is initialized and the plug-in-specific state variables is returned to the driver managing part 906 (909-4).

In FIG. 4, the conflict process rule description file 901 and the plug-in conflict process rule description file 908 is referenced in such a manner that they are included in (loaded into) the inference engine 902. This conflict process rule description file 901 and the conflict process rule description file 908 is also referenced to the conflict manager 903 so that the state variable list 904 is modified. Because the internal structure 905 and the state variable list 904 are associated with each other, these are mapped to each other.

Next, After generating the state list at step (808-4), the printer driver managing part 906 performs other initialization process and then returns the handle to the application 801 (808-5).

The application 801 waits (801-2) for acquiring the handle returned from the driver managing part 906 via the printer driver extension API 2000 at step (808-6), and if the handle is acquired (801-3), the application 801 will execute the print setting process using the acquired handle.

Next, the application 801 executes the setting modification process function F2 (preferably implemented as a part of the printer driver extension API 2000) exposed by the driver managing part 906 shown in FIG. 7 to execute the print setting modification (801-3). The arguments of this setting modification process function F2 include an identification of the setting item desired to be modified as shown in FIG. 7, the print setting information and an information passing data.

The setting modification process function 801 F2 of the driver managing part 906 is called from the application (801-4) and when the setting modification process function F2 of the driver managing part 906 is called (808-7), the driver managing part 906 identifies the setting item included in the arguments of the print setting modification process function F2 to call the setting modification process function (808-8) to determine whether it is the plug-in setting item (808-9).

If the driver managing part 906 determines that it is the plug-in setting item, the plug-in setting modification function is called (808-11), and when the plug-in setting modification function is called (909-5), the plug-in module 909 execute the plug-in setting modification process (909-6). Then the plug-in module 909 returns the modified conflict setting as a return value to the conflict manager 903 of the printer driver 808 (909-7) and process ends.

Alternatively, the plug-in module 909 may return the return value, and the main part of the printer driver 808 may wait until the return value is returned, and after the steps (808-10) and (808-11) in FIG. 5B, it may continue the processing.

Otherwise, if the driver managing part 906 determines that it is not the plug-in setting item at step (808-9), the modification process of the setting item occurs within the driver managing part 906 based on the information passed to the arguments of the setting modification process function F2 (808-10).

In the step (909-6) shown in FIG. 6, the setting item modification process at (808-10) shown in FIG. 5B occurs as follows.

Assume that a conflict process rule is described as follows: A(ON):-B(ON), C(OFF).

Where A, B and C are uniquely represent printer function names respectively.

FIG. 8 shows a relationship between the conflict manager 903 and the inference engine 902 shown in FIG. 4.

As shown in the state variable list 502 in FIG. 8, for each of A, B and C which are for example the function names of the printer 1500 shown in FIG. 1, a state variable having the same name exists.

Let cA, cB and cB be data member variables of the internal structure 501 in the printer driver corresponding to the function names A, B, and C of the printer 1500 respectively, and assume that values of state variables A, B, and C are binary (ON, OFF). The internal structure 501 has initial values within the driver or as an external file, and the values of initial state variables depend on the initial value of the corresponding internal structure 501 member.

As the initial value of cA is "0", the initial value of the corresponding state variable A is binary value OFF corresponding to "0". The values and method of mapping of the internal structure 501 and the state variables is programmed within the driver or as an external file.

Once the modified print setting information is passed to the conflict manager 903 by the application 801 or the UI driver, the conflict manager 903 searches related state variable from the passed print setting information, and modifies the value of the state variable according to the passed value. The state variable has a flag for discriminating whether the value of the state variable can be modified, therefore the flag determines whether the value of the state variable can be modified at this point.

This flag has two states of enable and disable, and if the modification can be made, this flag is in state of "enable". The conflict process rule 503 describes whether the modification can be made, and it is reflected on the state variable through the estimation of the inference engine 902. If the modification cannot be made, that is, If the print setting information is applied to the state variable having a flag of "disable", "NOTAVAILABLE" is returned without reflecting the print setting information.

The inference engine 902 estimates the state variable by the conflict process rule passed from the conflict manager 903 to evaluate the conflict. After the value of the state variable is modified, the related rule is evaluated using the value of the state variable modified by the inference engine 902 as a key.

In this embodiment, contents of the conflict process rule 901 of the printer driver main part in FIG. 3 and the plug-in conflict process rule 908 read at step (803-3) shown in FIG. 5 are evaluated.

If the value of other state variable must be modified by the rule evaluation, a list of the modified state variables and the modified values is received from the inference engine and the conflict manager 903 updates each state variable. If the value of the state variable is updated, using the updated state variable as a key, the conflict process rule is evaluated again. Since infinite loop may occur, the number of modifying the value of the state variable after the print setting information is passed is limited to one.

The above estimation-based setting modification process is described by way of example. Assume that in the inference engine, there is a conflict process rule 503 as follows.

A(ON):-B(ON), C(OFF), {enable}.

Assume that the left side of label:-is the left side of the expression, and the right side of label:-is the right side of the expression for the conflict process 503. Label "," denotes logical AND. Label ":" denotes logical OR. Label "." denotes termination of the rule. Inside between { } is used to modify a settable flag of the state variable.

As initial values of the state variables, assume that the values of A, B and C is all "OFF". And assume that the print setting information modified by the application 801 or the UI driver 803 is reflected on the state variable such that the value of B is "ON". The conflict manager 903 queries the inference engine 902 for the evaluation of the conflict process rule. With the value of the state variable B modified, the inference engine 902 estimates the conflict process rule associated with the state variable B.

In conflict rule, the conflict process rule is evaluated, and if the value of the state variable B is "ON" and the value of the state variable C is "OFF", evaluation of the right side of the conflict process rule holds true and the value of the state variable A in the left side is changed to "ON".

At the same time, the settable flag of the state variable is set to "enable". Once the estimation of the conflict process rule ends, the conflict manager 903 reflects the value of the modified state variable on all member of the internal structure 905. That is, the fact that the value of the state variable A is changed from "OFF" to "ON" causes the member cA in the internal structure 905 to be changed from "0" to "1".

The state variable can have the reason that the state variable itself is changed as a data. This is called as "REASON". REASON can be set by describing the conflict process rule as follows:

A(ON):-B(ON), C(OFF), rreason(BONANDCOFF).

"sreason" is a special description meaning that REASON is set in the conflict process rule. When evaluation of this conflict process rule holds true and the state variable A is "ON", "BONANDCOFF" is set to REASON of the state variable A.

REASON can also be inherited from REASON of other state variable. This is described in the conflict process rule as follows:

A(ON):-B(ON), C(OFF), rreason(B).

"rreason" is a special description meaning that RESON is acquired and inherited in the conflict process rule. When evaluation of this conflict process rule holds true and the state variable A is "ON", REASON of the state variable B is set to REASON of the state variable A.

As a particular example, there is a conflict rule as follows:

DUPLEX(OFF):-BOOKLET(ON), sreason(BOOKLETON), {disable}.

Particularly, when booklet print is "ON", it can be indicated as REASON that the state variable "DUPLEX" is "OFF" due to BOOKLETON. "disable" is assigned to the settable flag of the state variable DUPLEX, and if a print setting modification process for the state variable DUPLEX occurs thereafter, NOTAVAILABLE is returned. Flow returns to the flow charts in FIG. 5.

The handle values returned from the process at step (808-6) include that the setting modification process is successful in the case of OK, or that the setting modification is not possible now due to the influence of other setting.

Then, at step (808-12), it is determined that whether the return value of the setting modification process at step (909-6) and (808-10) is "NOTAVAILABLE", and if the driver managing part 906 determines that it is "NOTAVAILABLE", the process proceeds to step (808-13), where the conflict information is acquired from the conflict manager 903. This conflict information includes the information shown in FIG. 9.

Figure 9:
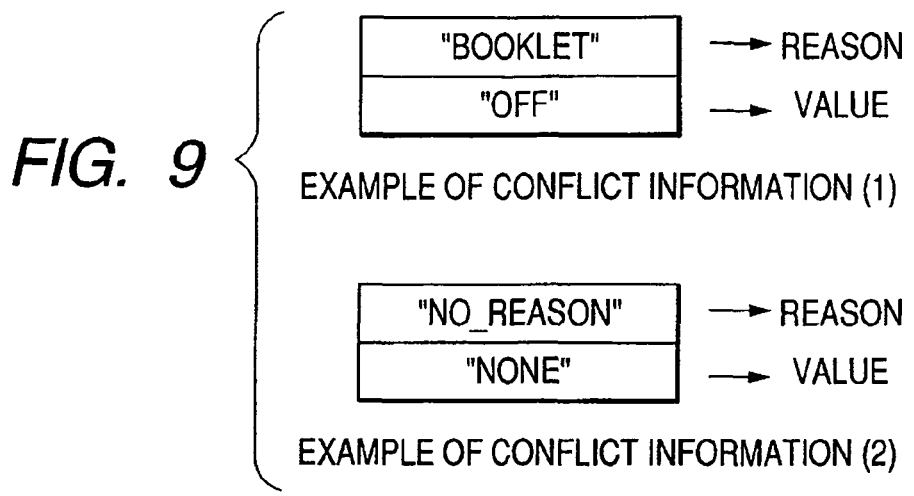
FIG. 9 shows an example of the conflict information acquired by the driver managing part shown in FIG. 4 from the conflict manager.

FIG. 9 shows an example of the conflict information acquired by the driver managing part 906 shown in FIG. 4 from the conflict manager 903.

A Reason shown in FIG. 9 stores a setting item that causes the conflict in the setting modification process at step (909-6) and (808-10), making setting impossible.

A Value shown in FIG. 9 stores the setting that can avoid the situation in which the setting modification is impossible.

A Reason in conflict information example (1) in FIG. 9 stores BOOKLET, therefore it can be seen that the setting modification process is impossible due to the BOOKLET setting. A Value stores OFF, therefore it shows that the conflict situation is avoided by setting BOOKLET to OFF.

On the other hand, a Reason in conflict information example (2) stores "NO_REASON", showing that there is no setting item causing the situation setting modification is now impossible. As the reason for this situation, it is expected that the specified setting modification cannot be made because the device option is not mounted, rather than the effect of other setting item, and so on. In such cases, Value in the conflict information stores "NONE" because conflict situation needs not be avoided.

Next, at step (801-4), After the conflict information acquired at step (808-13) is stored in the information passing data of last argument passed from the application 801, fail result is returned to the application via the printer driver extension API 2000 or the normal API 2001 (808-14).

On the other hand, if the driver managing part 906 determines to be "OK" or "FAILED", the result is returned to the application 801 via the printer driver extension API 2000 or the normal API 2001, and the process of the driver managing part 906 ends.

On receiving the discrimination result of the setting modification from the driver managing part 906 via printer driver extension API or the normal API 2001 at step (801-5), the application 801 acquires the result of the setting modification process from the driver managing part 906 (801-6).

Next, the result acquired from the step (801-6) is determined (801-7), and if it is determined to be "OK" or "FAILED", the process proceeds to step (801-11).

Otherwise, if it is determined to be "NOTAVAILABLE" at step (801-7), the conflict information which is acquired by driver managing part 906 and passed to the arguments of the setting modification process function F2 is referenced (801-8).

Then, the conflict information referenced at step (801-8) is determined (801-9), and if it is determined that "NO_REASON" is stored in Reason in the conflict information, the process proceeds to step (801-11).

Otherwise, at step (801-9), the application 801 determines that any setting item is stored in Reason in the conflict information, with reference to Value in the conflict information and with setting value stored in Value being set to the setting item in Reason using the setting modification process function F2 shown in FIG. 7, the situation is avoided (801-10) in which the setting modification process cannot be made at step (808-6).

Next, it is determined that whether all setting modification process has ended (801-11), and if not, the process returns to step (801-4) again to call the setting modification process function F2, and the series of processes is repeated between step (801-4) and step (801-10) until the required setting processes end.

Otherwise, at step (801-11), if it is determined that all setting modification process has ended, the setting modification process exit function F3 is performed (801-12), and the process ends.

With the above process, in an environment in which functional extension of the printer driver is provided in a plug-in form, in the case that a function extended by the plug-in is controlled from the application 801 using a special interface, means for avoiding the situation in which the setting modification process cannot be provided due to an effect of other print setting can be provided.

Although in this embodiment a medium for recording the print-related program is an external memory, the external memory may be FD, HD drive, CD-ROM, IC memory card or the like. Further, it is also possible to record the print program alone or along with OS or other program running on the host computer and configure it such that it forms a part of the memory map, thereby directly executing it by the CPU 1.

Second Embodiment

With reference to a memory map in FIG. 10, a configuration of a data processing program which is readable by a data processing device according to the present invention is described below.

Figure 10:
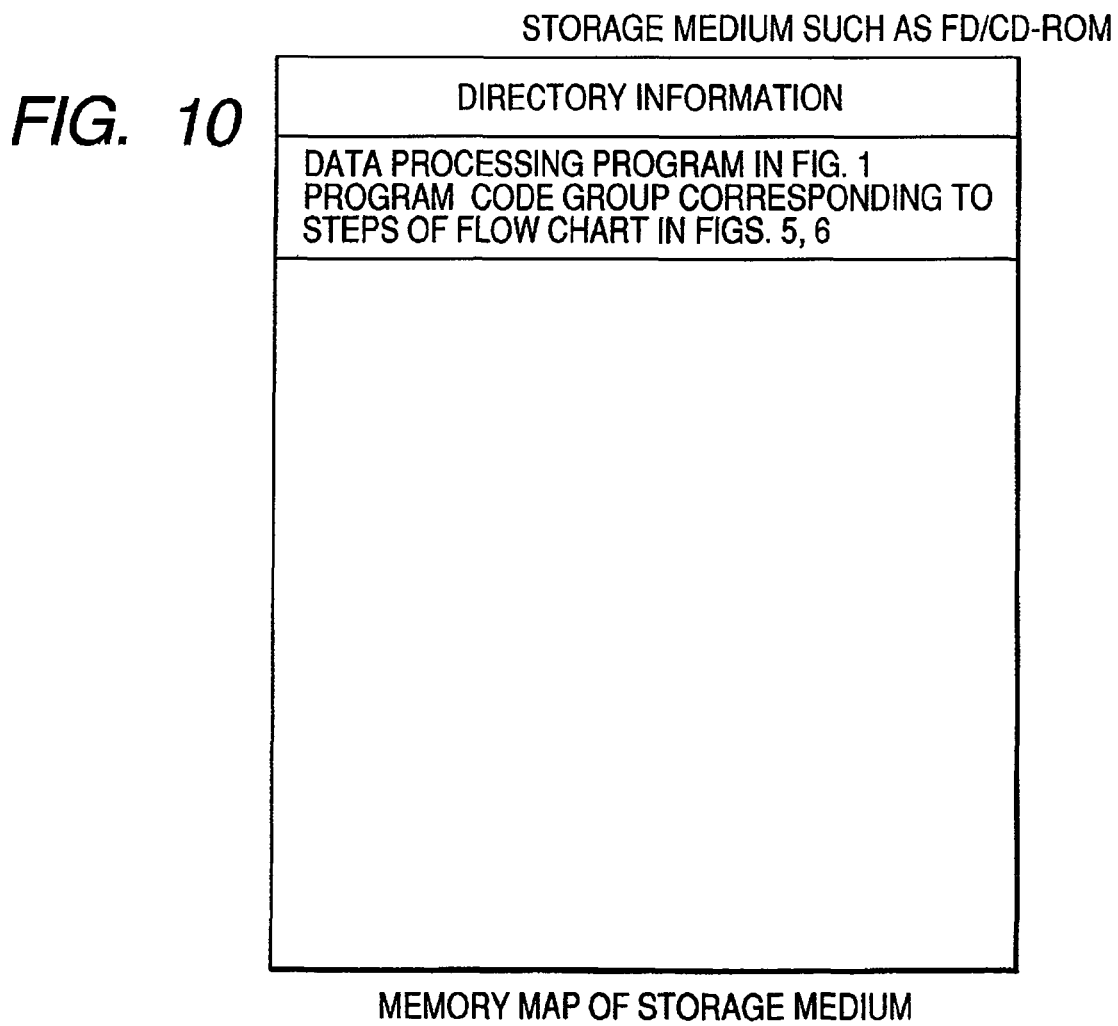
FIG. 10 describes a memory map of a storage device storing various types of data processing programs which is readable by the data processing device according to the present invention.

FIG. 10 describes a memory map of a storage device storing various types of data processing programs which is readable by the data processing device according to the present invention.

Although not shown, information managing a program group stored in the storage device such as version information and author may also be stored, and information depending on OS or the like at program reading side such as an icon for displaying and identifying a program may also be stored.

Further, a data depending on various types of programs is managed within the directory. A program for installing various types of program, or in the case that an installed program is compressed, a decompress program or the like may also be stored.

Using an externally installed program, the function shown in FIGS. 5, 6 in this embodiment may be executed by a host computer. In this case, the present invention applies even if information group including programs is supplied to an output device by a storage device such as CD-ROM, flash memory or FD or from an external storage device via a network.

It is obvious that the object of the present invention can be achieved by supplying to a system or a device a storage device recording a software program code for providing the functions of the above-described embodiments and reading and executing the program code stored in the storage device by a computer (or CPU or MPU) of the system or the device.

In this case, the program code itself read from the storage device will provide the novel function according to the present invention, and the storage device storing the program code will constitute the present invention.

Therefore, regardless of the form of a program, an object code, a program executed by an interpreter, a script data supplied to OS or the like having a programming function may be used.

As a storage device for supplying the program, for example, flexible disk, hard disk, optical disk, magneto-optical disk, MO, CD-ROM, CD-R, CD-RW, magnetic tape, non-volatile memory card, ROM, DVD or the like can be used.

In this case, the program code itself read from the storage device will provide the novel function according to the present invention, and the storage device storing the program code will constitute the present invention.

As another method of supplying a program, the program can be supplied by connecting to a home page in Internet using a browser in a client computer and downloading the program itself or a compressed file including an automatic installation function in a recording medium such as a hard disk. Also, it can be achieved by dividing a program code constituting the program according to the present invention into multiple files and downloading each file from different home pages. That is, the claims of the present invention include a WWW server, an ftp server or the like for causing a plurality of users to download program files for providing the functional process in a computer.

It may also be provided by storing the program according to the present invention in a storage device such as CD-ROM, delivering it to users and allowing users meeting a predetermined condition to download from a home page key information for decrypting and to execute the encrypted program using the key information to install it in the computer.

Also, it is obvious that the functions in the above-described embodiments may be provided not only by executing a program code read from a computer, but also by performing some or all of actual processings based on instructions of the program code by OS (operating system) or the like running on the computer.

Also, it is obvious that after the program code read from the storage device is written into a memory included in a function extension board inserted into a computer or a function extension unit connected to the computer, a CPU included in the function extension board or the function extension unit may execute some or all of an actual processings based on instructions of the program code, so that the functions in the above-described embodiments may be provided.

The present invention is not limited to the above embodiments, but various modifications (including combinations of each embodiment) may be made based on the spirit of the present invention, and these are not excluded from the scope of the present invention.

Although the present invention is described with reference to various examples and embodiments, it is obvious that the sprint and the scope of the present invention is not limited to the particular description herein, and include following embodiments.

In the above first embodiment, although each function process is described as a data processing device including a printer driver, an application and a plug-in module, a print control device in which the printer driver is separated can also be configured.

A data processing device for processing a print request from the application (the application 801 shown in FIG. 4) via a printer driver (the printer driver 808 shown in FIG. 3), the data processing device having plug-means (the plug-in module set 910 shown in FIG. 4) including a plug-in module for extending the printer driver function in an add-in form and a conflict process rule for evaluating a function with which the plug-in module cannot be set simultaneously, discrimination means (the inference engine 902 shown in FIG. 4) for discriminating whether the print setting can be modified according to query from the printer driver by acquiring the conflict process rule when the print setting to the printer driver from the application is indicated and generating predetermined response information, and notification means (the driver managing part 906 shown in FIG. 4) for notifying the application of the predetermined response information generated by the discrimination means via the printer driver can also be configured.

This allows to recognize what conflict occurs between the print setting at the application side and the extended function being set in an environment in which the functional extension of the printer driver is provided in a plug-in form and to easily construct a convenient print setting processing environment that can be automatically changed to a print setting in which the extended function does not conflicts with the application side setting.

In an environment in which functional extension of the printer driver is provided in a plug-in form, in the case that a function extended by the plug-in is controlled from an application using a special interface, the situation in which the setting modification process cannot be provided due to an effect of other print setting can be avoided, and the desired print setting is provided from the application.

This embodiment allows to generate response information from which the application can recognize what conflict occurs between the print setting at the application side and the extended function being set in an environment in which the functional extension of the printer driver is provided in a plug-in form.

This allows to automatically set a conflict-free print setting without setting modification by users understanding what conflict occurs between the print setting at the application side and the extended function being set in an environment in which the functional extension of the printer driver is provided in a plug-in form, thereby increasing convenience A print setting processing method in a data processing device for processing a print request from the application via the printer driver, the data processing device including plug-in means including a plug-in module for extending the printer driver function in an add-in form and a conflict process rule for evaluating a function with which the plug-in module cannot be set simultaneously, the method having a discrimination step (steps (808-1) to (808-13) shown in FIG. 5B, and steps (909-1) to (909-7) shown in FIG. 6) of discriminating whether the print setting can be modified according to query from the printer driver by acquiring the conflict process rule when the print setting to the printer driver from the application is indicated, and a notification step (step (808-14) shown in FIG. 5B) for notifying the application of the predetermined response information generated by the discrimination step via the printer driver can also be provided.

This application claims priority from Japanese Patent Application No. 2004-330476 filed on Nov. 15, 2004, which is hereby incorporated by reference herein.

What is claimed is:

1. A data processing device for processing a print request from an application using a plug-in module for extending a function of a printer driver, the data processing device comprising:
a communication unit adapted to receive a notification of a setting value used for a printing process via an extension API from the application, the extension API being defined between the application and the printer driver, the application being able to control the plug-in module using the extension API;
a determination unit adapted to determine whether the setting value notified from the application is related to the function extended by the plug-in module; and
a discrimination unit adapted to discriminate, if the determination unit determines that the setting value is related to the function extended by the plug-in module, a conflict between the setting value and a setting value inputted to the printer driver by executing a conflict manager program to evaluate a conflict rule obtained from the printer driver and a conflict rule obtained from the plug-in module,
wherein the communication unit notifies the application of response information relating to the reason for the conflict by calling the extension API, wherein the reason for the conflict is originated from parameters for the conflict rules evaluated by the conflict manager program and wherein the reason includes another setting value as information indicating how to avoid the conflict so that the setting value determined to be related to the extended function can be used.

2. The data processing device according to claim 1, wherein if said discrimination unit determines that the print setting value cannot be modified, said discrimination unit generates information indicating the response information indicating the reason for the conflict from information indicating the reason for not being able to modify the print setting value and from information indicating a setting value for avoiding the situation in which the print setting value cannot be modified.

3. The data processing device according to claim 1, wherein based on the response information relating to the conflict notified via the printer driver, a print setting value being effective for avoiding the conflict is set again to the printer driver based on an input from the application.

4. The data processing device according to claim 1, wherein said communication unit notifies the application of the response information via a printer driver extension API implemented as a part of the printer driver or a part of operating system.

5. The data processing device according to claim 1, wherein said discrimination unit discriminates a conflict between at least one of booklet print setting, 2-UP print setting and duplex print setting, and other setting.

6. A method in a data processing device for processing a print request from an application using a plug-in module for extending a function of a printer driver, comprising:
a communication step of receiving a notification of a setting value used for a printing process via an extension API from the application, the extension API being defined between the application and the printer driver, the application being able to control the plug-in module using the extension API;
a determination step of determination whether the setting value notified from the application is related to the function extended by the plug-in module; and
a discrimination step of discriminating, if it is determined at the determination step that the setting value is related to the function extended by the plug-in module, a conflict between the setting value and a setting value inputted to the printer driver by executing a conflict manager program to evaluate a conflict rule obtained from the printer driver and a conflict rule obtained from the plug-in module,
wherein the application is notified of response information relating to the reason for the conflict by calling the extension API, wherein the reason for the conflict is originated from parameters for the conflict rules evaluated by the conflict manager program and wherein the reason includes another setting value as information indicating how to avoid the conflict so that the setting value determined to be related to the extended function can be used.

7. The data processing method according to claim 6, wherein if said discrimination step determines that the print setting cannot be modified, said discrimination step generates information indicating the response information indicating the reason for the conflict from information indicating the reason for not being able to modify the print setting and from information indicating a setting for avoiding the situation in which the print setting cannot be modified.

8. The data processing method according to claim 6, wherein based on the response information relating to the conflict notified via the printer driver, a print setting being effective for avoiding the conflict is set again to the printer driver based on an input from the application.

9. The data processing method according to claim 6, wherein said communication step notifies the application of the response information via a printer driver extension API implemented as a part of the printer driver or a part of operating system.

10. The data processing method according to claim 6, wherein said discrimination step discriminates a conflict between at least one of booklet print setting, 2-UP print setting and duplex print setting, and other setting.

11. A control program stored in a computer-readable storage device for causing a computer to perform a data processing method of processing a print request from an application using a plug-in module for extending a function of a printer driver, the method comprising:

a communication step of receiving a notification of a setting value used for a printing process via an extension API from the application, the extension API being defined between the application and the printer driver, the application being able to control the plug-in module using the extension API;

a determination step of determination whether the setting value notified from the application is related to the function extended by the plug-in module; and a discrimination step of discriminating, if it is determined at the determination step that the setting value is related to the function extended by the plug-in module, a conflict between the setting value and a setting value inputted to the printer driver by executing a conflict manager program to evaluate a conflict rule obtained from the printer driver and a conflict rule obtained from the plug-in module, wherein the application is notified of response information relating to the reason for the conflict by calling the extension API, wherein the reason for the conflict is originated from parameters for the conflict rules evaluated by the conflict manager program and wherein the reason includes another setting value as information indicating how to avoid the conflict so that the setting value determined to be related to the extended function can be used.

* * * * *